(12) United States Patent
Peng et al.

(10) Patent No.: US 8,482,501 B2
(45) Date of Patent: *Jul. 9, 2013

(54) LIQUID CRYSTAL DISPLAY DEVICE WITH CONTROLLABLE VIEWING ANGLE AND DRIVING METHOD THEREOF

(75) Inventors: Xuhui Peng, Shanghai (CN); Zhihua Ling, Shanghai (CN); Sitao Huo, Shanghai (CN); Xinghua Nie, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 183 days.

This patent is subject to a terminal disclaimer.

(21) Appl. No.: 12/866,197

(22) PCT Filed: Feb. 27, 2009

(86) PCT No.: PCT/CN2009/070566
§ 371 (c)(1),
(2), (4) Date: Aug. 5, 2010

(87) PCT Pub. No.: WO2009/109124
PCT Pub. Date: Sep. 11, 2009

(65) Prior Publication Data
US 2011/0025675 A1 Feb. 3, 2011

(30) Foreign Application Priority Data
Mar. 4, 2008 (CN) .......................... 2008 1 0034193

(51) Int. Cl.
*G09G 3/3648* (2006.01)
*G09G 3/3614* (2006.01)

(52) U.S. Cl.
USPC .................................. 345/87; 345/50; 345/51

(58) Field of Classification Search
USPC ............. 345/204–215, 690–699; 349/90–141
See application file for complete search history.

(56) References Cited

U.S. PATENT DOCUMENTS
7,298,445 B1  11/2007 Choi et al.
(Continued)

FOREIGN PATENT DOCUMENTS
CN         1688920 A     10/2005
(Continued)

OTHER PUBLICATIONS

Z. L. Xie et al. Permanent grayscales in bistable twisted nematic liquid-crystal displays. American Institute of Physics. Applied Physics Letters. Vol. 81, No. 14. Sep. 30, 2002.
(Continued)

*Primary Examiner* — Kent Chang
*Assistant Examiner* — William Lu
(74) *Attorney, Agent, or Firm* — Harness, Dickey & Pierce, P.L.C.

(57) ABSTRACT

A liquid crystal display device with controllable viewing angle of the present invention has an upper substrate (101) on which an upper substrate common electrode (103) is disposed, a lower substrate (102) on which a pixel electrode is disposed, and a liquid crystal layer (107) sandwiched between the upper substrate (101) and the lower substrate (102). The liquid crystal molecules are vertical to the upper substrate (101) in substance when no voltage is applied, and a plurality of parallel strip-like lower substrate common electrodes (104) are disposed on the lower substrate (102). The upper substrate common electrode (103) and the pixel electrode (105) provide an electric field perpendicular to the upper substrate (101) in order to form a first viewing angle mode when a voltage is applied, the lower substrate common electrode (104) and the pixel electrode (105) provide an electric field perpendicular to the upper substrate (101) and an electric field parallel to the upper substrate (101) in order to form a second viewing angle mode when a voltage is applied. A method of driving the said liquid crystal display device is also disclosed.

9 Claims, 5 Drawing Sheets

U.S. PATENT DOCUMENTS

| | | | |
|---|---|---|---|
| 7,468,719 B2 * | 12/2008 | Kawachi | 345/98 |
| 7,663,587 B2 * | 2/2010 | Yamada et al. | 345/89 |
| 7,728,801 B2 * | 6/2010 | Tsai et al. | 345/87 |
| 7,924,375 B2 * | 4/2011 | Chung et al. | 349/114 |
| 2005/0157231 A1 | 7/2005 | Yang et al. | |
| 2005/0219446 A1 | 10/2005 | Hisatake | |
| 2005/0286000 A1 | 12/2005 | Tsai et al. | |
| 2006/0146250 A1 * | 7/2006 | Wu et al. | 349/141 |
| 2007/0024789 A1 * | 2/2007 | Itou et al. | 349/139 |
| 2007/0121047 A1 | 5/2007 | Chung et al. | |
| 2007/0146606 A1 | 6/2007 | Yamashita | |
| 2007/0153196 A1 | 7/2007 | Jang et al. | |
| 2007/0176872 A1 * | 8/2007 | Kazuyoshi et al. | 345/90 |
| 2008/0068523 A1 | 3/2008 | Mitsui et al. | |

FOREIGN PATENT DOCUMENTS

| | | |
|---|---|---|
| CN | 1975518 A | 6/2007 |
| CN | 1991461 A | 7/2007 |
| CN | 1991466 A | 7/2007 |
| CN | 1991535 A | 7/2007 |
| CN | 101149540 A | 3/2008 |
| JP | 2005292586 A | 10/2005 |
| JP | 2005292709 A | 10/2005 |
| JP | 2006011451 A | 1/2006 |
| JP | 2007034151 A | 2/2007 |
| KR | 20000060543 A | 10/2000 |
| WO | WO-2004019117 A2 | 3/2004 |
| WO | WO-200810333 A1 | 1/2008 |

OTHER PUBLICATIONS

Extended European Search Report regarding Application No. 09716829.8-1228 / 2256542, dated Jul. 26, 2012.

Third Korean Office Action regarding Application No. 10-2010-7018211, dated Mar. 29, 2013. Translation provided by Unitalen Attorneys at Law.

* cited by examiner

LIQUID CRYSTAL DISPLAY DEVICE WITH CONTROLLABLE VIEWING ANGLE AND DRIVING METHOD THEREOF

This application claims the benefit of Chinese Application No. 200810034193.7, filed with the Chinese Intellectual Property Office on Mar. 4, 2008, entitled "Liquid Crystal Display Device with Controllable Viewing Angle and Driving Method Thereof", the overall disclosure of which is hereby incorporated herein by reference.

FIELD OF INVENTION

The present invention generally relates to a liquid crystal display device and a driving method thereof, and more particularly to a liquid crystal display which is capable of switching viewing angle and a driving method thereof.

BACKGROUND OF THE INVENTION

In recent years, liquid crystal display device is widely used to display information on the electronic products due to it is light and thin, and lower power consumption.

Liquid crystal display devices may be classified into two kinds as wide viewing angle and narrow viewing angle according to the range of viewing angle. Generally, there is a constraint on the viewing angle for the conventional Twisted Nematic (TN) liquid crystal display, i.e., the displayed contents may be seen clearly only at a specific viewing angle. To alleviate the constraint on the viewing angle of the liquid crystal display, and to make the user see the displayed contents clearly at any angle, various technologies about wide viewing angle have been proposed in the prior art, such as attaching viewing angle compensation film to the Liquid Crystal Display, Multi-domain Vertical Alignment Liquid Crystal Display, In-Plane-Switching Liquid Crystal Display. Although widening viewing angle technologies become the trend in the art, in some applications of liquid crystal displays, it is expected to constrain the viewing angle, such that user may see the images on the liquid crystal displays just at a specific angle to protect privacy.

In the prior art, a liquid crystal display with controllable viewing angle has been discussed. In Chinese Patent Application Publication CN1991466A, a modulation electrode is added to the In-Plane-Switching Liquid Crystal Display (in IPS display mode or FFS display mode) to achieve a conversion from wide viewing angle to narrow viewing angle. The viewing angle conversion liquid crystal display performs the conversion between a wide viewing angle and a narrow viewing angle, and therefore the wide viewing angle or the narrow viewing angle may be obtained respectively on the same liquid crystal display according to different requirements.

The prior art described above are all related to the switch between the wide viewing angle and the narrow viewing angle. Although the technology for switching between the wide viewing angle and the narrow viewing angle may meet the requirements on safety and privacy, it may not meet the requirement on the diversification of viewing angle directions.

SUMMARY OF THE INVENTION

An object of the present invention is to provide a liquid crystal display device with controllable viewing angle which may obtain various viewing angle directions easily depending on different requirements.

Another object of the present invention is to provide a driving method for a liquid crystal display device with controllable viewing angle, and the viewing angle of the liquid crystal display device may be adjusted simply depending on different requirements by the method.

In order to solve above problems, the liquid crystal display device with controllable viewing angle according to the present invention includes an upper substrate on which an upper substrate common electrode is disposed, a lower substrate parallel to the upper substrate, on which a pixel electrode is disposed, and a liquid crystal layer sandwiched between the upper substrate and the lower substrate, the liquid crystal molecules are perpendicular to the upper substrate in substance when no voltage is applied, and a plurality of parallel strip-like lower substrate common electrodes disposed on the lower substrate, wherein the upper substrate common electrode and the pixel electrode provide an electric field perpendicular to the upper substrate in order to form a first viewing angle mode when a voltage is applied to the upper substrate common electrode and the pixel electrode. The lower substrate common electrode and the pixel electrode provide an electric field perpendicular to the upper substrate and an electric field parallel to the upper substrate in order to form a second viewing angle mode when a voltage is applied to the lower substrate common electrode and the pixel electrode.

Preferably, the lower substrate common electrode is floated when a voltage is applied to the upper substrate common electrode and the pixel electrode, and the upper substrate common electrode is floated when a voltage is applied to the lower substrate common electrode and the pixel electrode.

Preferably, in the liquid crystal display device with controllable viewing angle according to the present invention, the anisotropy of the liquid crystal molecules is negative.

Preferably, an insulation layer is disposed between the lower substrate common electrode and the pixel electrode.

In addition, in order to solve above problems, a driving method for the liquid crystal display device with controllable viewing angle includes following steps: applying a voltage to the upper substrate common electrode and the pixel electrode to generate an electric field perpendicular to the upper substrate and thus provide a first viewing angle mode; applying a voltage to the lower substrate common electrode and the pixel electrode to generate an electric field perpendicular to the upper substrate and an electric field parallel to the upper substrate and thus provide a second viewing angle mode; and switching the first viewing angle mode and the second viewing angle mode by selectively applying the voltage to the upper substrate common electrode or the lower substrate common electrode.

The advantages of the present invention are in that it is convenient in operations to select different viewing angles by switching a potential between the lower substrate common electrode and the upper substrate common electrode. Furthermore, compared with other liquid crystal displays which is switched between a wide viewing angle and a narrow viewing angle, the liquid crystal display device according to the present invention achieves a characteristic of viewing angle diversity, implements to switch between different viewing angles, and satisfies the user's requirements on different viewing directions, thus satisfies both the user's privacy and the viewing angle diversity, and meanwhile the liquid crystal display device according to the present invention may be manufactured by simple producing process, therefore a reduced cost of the liquid crystal display device with controllable viewing angle and an increased productivity may be realized.

DESCRIPTION OF THE PREFERRED EMBODIMENTS

The embodiments of the present invention will be described in detail with reference to the accompanying drawings.

Figure 1:
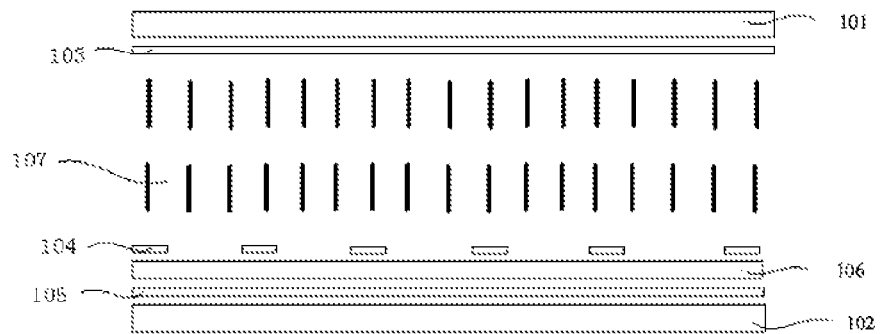
FIG. 1 is a sectional diagram of a liquid crystal display device with controllable viewing angle according to the present invention.

FIG. 1 is a sectional diagram of a liquid crystal display device with controllable viewing angle according to the present invention. As shown in FIG. 1, the liquid crystal display device with controllable viewing angle according to the present invention includes a lower glass substrate 102 and an upper glass substrate 101. A pixel electrode 105 is formed on the upper surface of the lower glass substrate 102, an insulation layer 106 is deposited on the pixel electrode 105, and a lower substrate common electrode 104 is formed on the insulation layer 106; an upper substrate common electrode 103 is formed on the upper glass substrate 101; and a liquid crystal layer 107 is filled between the upper substrate common electrode 103 and the lower substrate common electrode 104, the liquid crystal molecules in the liquid crystal layer 107 have negative dielectric anisotropy. In an initial state, no voltage is applied, the liquid crystal molecules in the liquid crystal layer 107 are arranged perpendicular to the upper glass substrate 101 and the lower glass substrate 102. In a preferred embodiment of the present invention, the lower substrate common electrode 104, the upper substrate common electrode 103 and the pixel electrode 105 are all transparent electrodes, for example transparent conductive layers formed by tin indium oxide (ITO), indium zinc oxide (IZO), or indium gallium oxide (IGO). The insulation layer 106 may be a transparent protecting layer, such as silicon oxide or organic material layer. As the liquid crystal display device with controllable viewing angle according to the present invention adopts a display mode similar to the In-Plane-Switching, the lower substrate common electrode 104 is preferred configured to be only formed portions above of the pixel electrode 105. For example, the lower substrate common electrode 104 is formed to be strips of protuberances which are arranged in the same direction and there are certain intervals between adjacent strips to expose portions of the surface of the pixel electrode 105.

Figure 2:
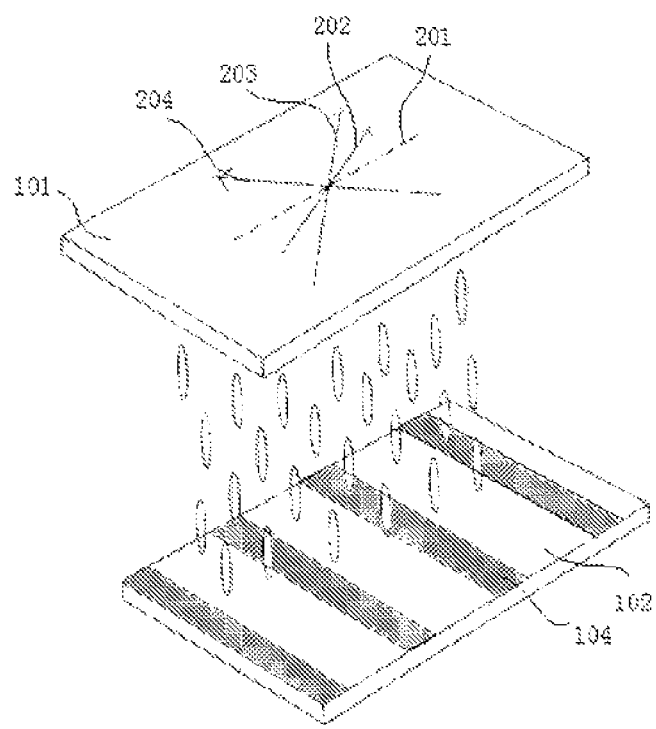
FIG. 2 is a diagram of the polarization direction and the liquid crystal orientation direction in an initial state of the liquid crystal display device with controllable viewing angle according to the present invention.

FIG. 2 is a diagram of the polarization direction of lights and orientation direction of liquid crystal molecules of the liquid crystal display device with controllable viewing angle according to the present invention. As shown in FIG. 2, in a preferred embodiment of the present invention, the orientation of the liquid crystal molecules is perpendicular to the upper substrate. The liquid crystal molecules are arranged to have a pretilt angle of 88 degree by rubbing process, wherein the tilting direction is indicated by 202, and the angle between 202 and the direction 201 of the short side of the pixel is 5 degree. The absorption axis direction of the polarization plate of the upper substrate is indicated by 203, and the angle between 203 and the direction 201 of the short side of the pixel is 45 degree; the absorption axis direction of the polarization plate of the lower substrate is indicated by 204, and the angle between 204 and the direction 201 of the short side of the pixel is 135 degree, thus the absorption axes of the polarization plates of the upper substrate and the lower substrate are orthogonal.

Figure 3:
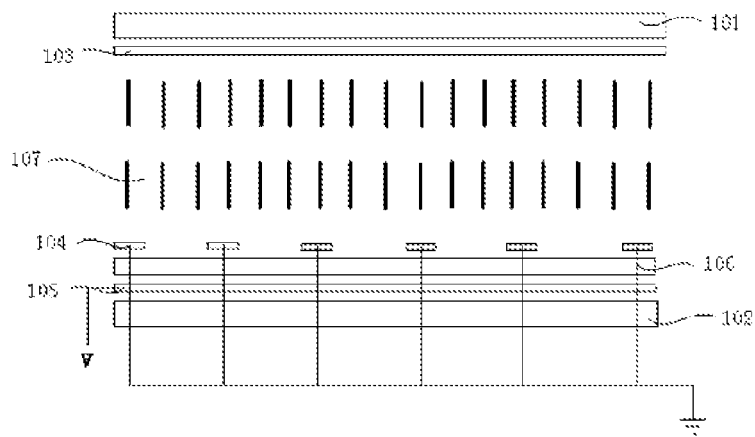
FIG. 3 is a diagram of the state of the electrode when the liquid crystal display device with controllable viewing angle according to the present invention is in 6 o'clock viewing angle direction.

FIG. 3 is a diagram of the state of the electrode when the liquid crystal display device with controllable viewing angle according to the present invention is in the second viewing angle mode (6 o'clock viewing angle direction). As shown in FIG. 3, the liquid crystal display device with controllable viewing angle according to the present invention is operated in the 6 o'clock viewing angle direction mode (lower viewing angle mode), thus the liquid crystal display device with controllable viewing angle may obtain a high contrast only in the 6 o'clock direction, and a remarkable optical performance difference, such as serious gray scale inversion, is generated in other viewing angles, such that the image can not be seen clearly. To provide the 6 o'clock viewing angle direction, when the liquid crystal display device with controllable viewing angle according to the present invention is operating in the 6 o'clock viewing angle direction mode, a perpendicular electrical field and a horizontal electrical field are generated in the liquid crystal layer 107 by the pixel electrode 105 and the lower substrate common electrode 104, for example, by applying a driving voltage V to the pixel electrode 105, connecting the lower substrate common electrode 104 to the ground, and floating the upper substrate common electrode 103, to control the redirection of the liquid crystal such that the liquid crystal molecules in the liquid crystal layer 107 deflect towards the direction perpendicular to the perpendicular electrical field and the horizontal electrical field (the liquid crystal molecules in the liquid crystal layer 107 have negative dielectric anisotropy), and parallel to the upper glass substrate 101 and the lower glass substrate 102.

As showed in FIG. 3, when there is no voltage applied, the liquid crystal molecules are arranged perpendicular to the upper glass substrate 101 and the lower glass substrates 102, the polarization plates are attached to the upper glass substrate 101 and the lower glass substrate 102 with the absorb axes of the polarization plates vertical to each other, the liquid crystal display is in a dark state. When a voltage is applied between the pixel electrode 105 and the lower substrate common electrode 104, the liquid crystal molecules in the liquid crystal layer 107 deflect towards a plane formed by the perpendicular electrical field and the horizontal electrical field, that is, towards the strip direction of the lower substrate common electrode, thus an angle between the falling direction and the absorption axes of the upper and lower polarization plates is 45 degree, the liquid crystal display is in a bright state.

Figure 4:
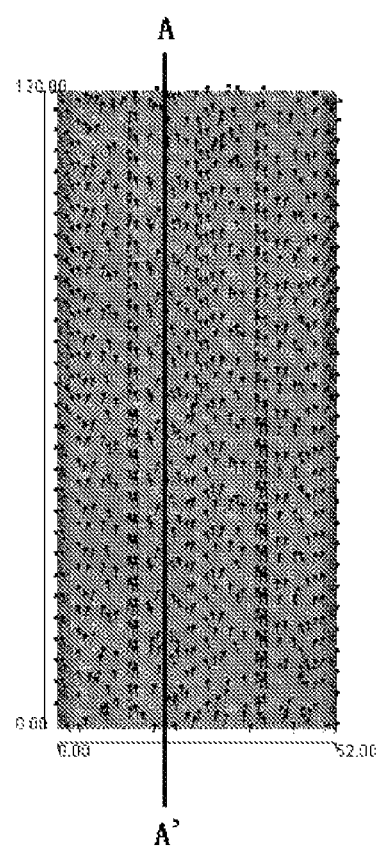
FIG. 4 is a top view diagram of the arrangement of liquid crystal molecules in the case of the application of a voltage when the liquid crystal display device with controllable viewing angle according to the present invention is in 6 o'clock viewing angle direction.
Figure 5:
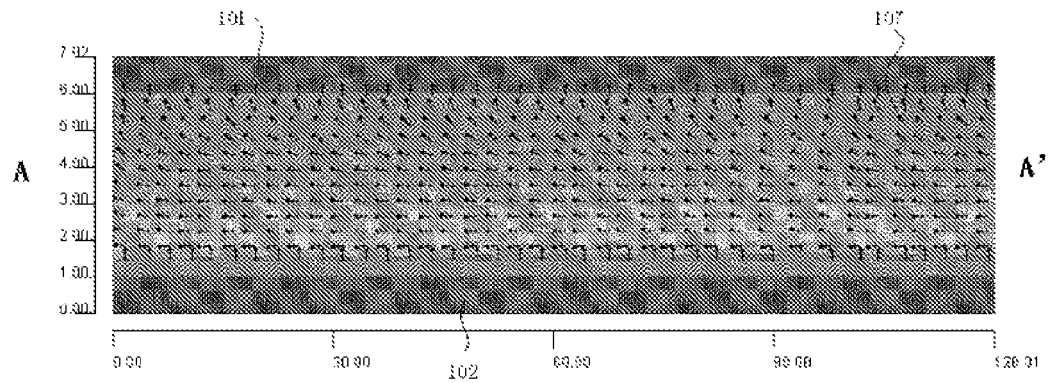
FIG. 5 is a sectional view of the top view diagram of the arrangement of liquid crystal molecules in the case of the application of a voltage when the liquid crystal display device with controllable viewing angle according to the present invention is in 6 o'clock viewing angle direction.
Figure 6:
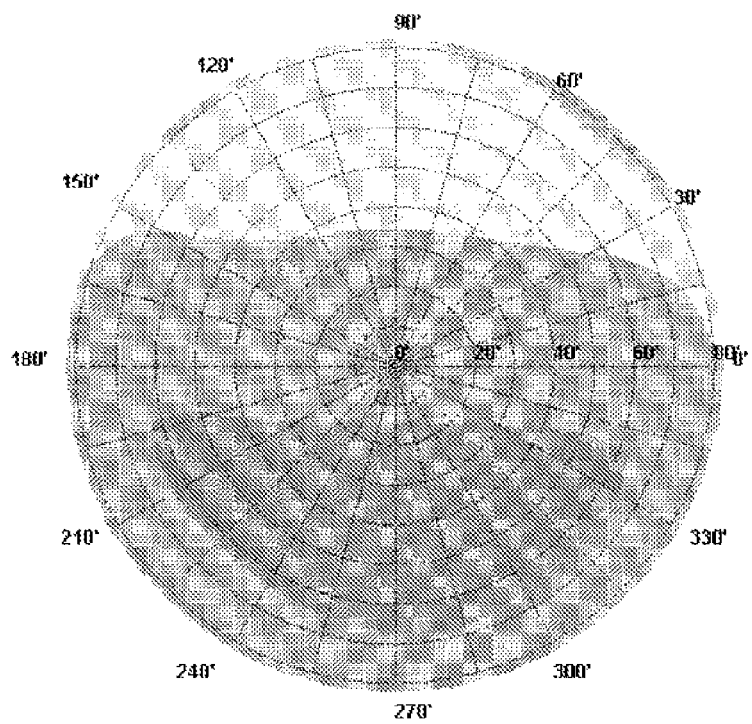
FIG. 6 is a viewing angle characteristic simulation diagram when the liquid crystal display device with controllable viewing angle according to the present invention is in 6 o'clock viewing angle direction.

Refer to FIG. 4 and FIG. 5, and FIG. 4 shows the arrangement direction distribution diagram of the liquid crystal molecules to which a voltage is applied in the 6 o'clock viewing angle direction mode and FIG. 5 shows a sectional diagram taken along line AA' in the FIG. 4. FIG. 6 shows a viewing angle characteristic simulation diagram in the 6 o'clock viewing angle direction mode.

Figure 7:
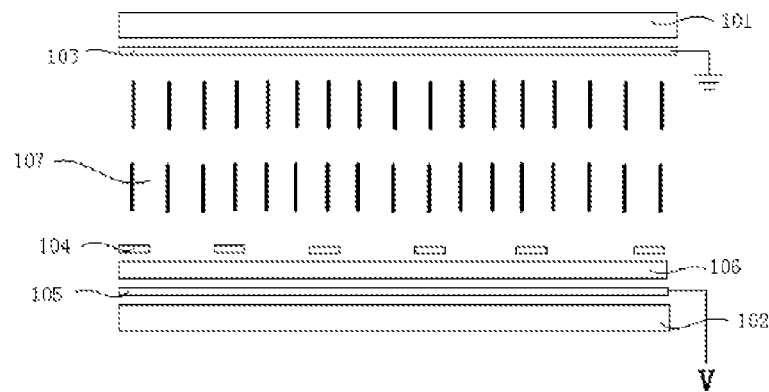
FIG. 7 is a diagram of the state of the electrode when the liquid crystal display device with controllable viewing angle according to the present invention is in 9 o'clock viewing angle direction.

FIG. 7 shows a diagram of the first viewing angle mode (9 o'clock viewing angle direction mode). As shown in FIG. 7, the liquid crystal display device with controllable viewing angle according to the present invention is operated in the 9 o'clock viewing angle direction mode (left viewing angle mode), thus a high contrast may be obtained only in the 9 o'clock direction, and a remarkable optical property difference, such as serious gray scale inversion, is generated in other viewing angle directions, so that the image can not be seen clearly. To achieve the object, when the liquid crystal display device with controllable viewing angle according to the present invention is operating in the 9 o'clock viewing angle direction mode, a perpendicular electrical field is generated in the liquid crystal layer 107 by the pixel electrode 105 and the upper substrate common electrode 103, for example, by applying a driving voltage V to the pixel electrode 105, connecting the upper substrate common electrode 103 to the ground, and floating the lower substrate common electrode 104 to control the redirection of the liquid crystal, so that the liquid crystal molecules in the liquid crystal layer 107 deflect along the pretilt direction 202. When there is no voltage applied, the liquid crystal molecules are arranged vertically, the polarization plates are attached to the upper glass substrate 101 and the lower glass substrate 102 orthogonally, which is a dark state; when there is a voltage applied between the pixel electrode 105 and the upper substrate common electrode 103, the liquid crystal molecules deflect along the pretilt direction 202 (the liquid crystal molecules in the liquid crystal layer 107 have negative dielectric anisotropy), and become parallel to the upper glass substrate 101 and the lower glass substrate 102, that is, deflect towards a direction perpendicular to the strip direction of the lower substrate common electrode, and form an 40 degree angle between the deflecting direction and the absorption axis of the upper polarization plate, and an 130 degree angle between the falling direction and the absorption axis of the lower polarization plate, which is a bright state.

Figure 8:
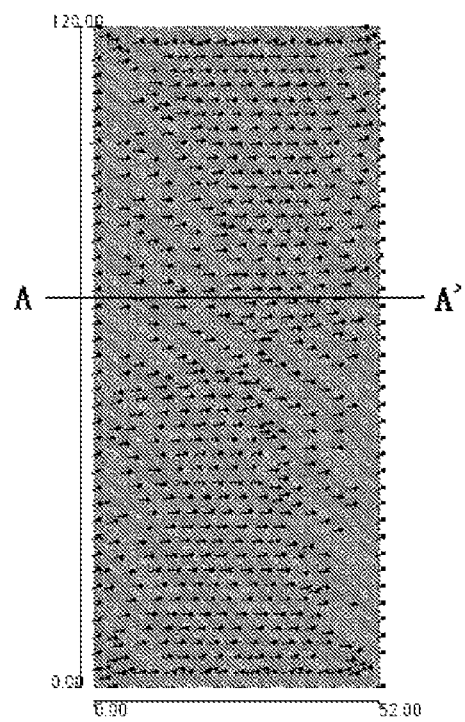
FIG. 8 is a top view diagram of the arrangement of liquid crystal molecules in the case of the application of a voltage when the liquid crystal display device with controllable viewing angle according to the present invention is in 9 o'clock viewing angle direction.
Figure 9:
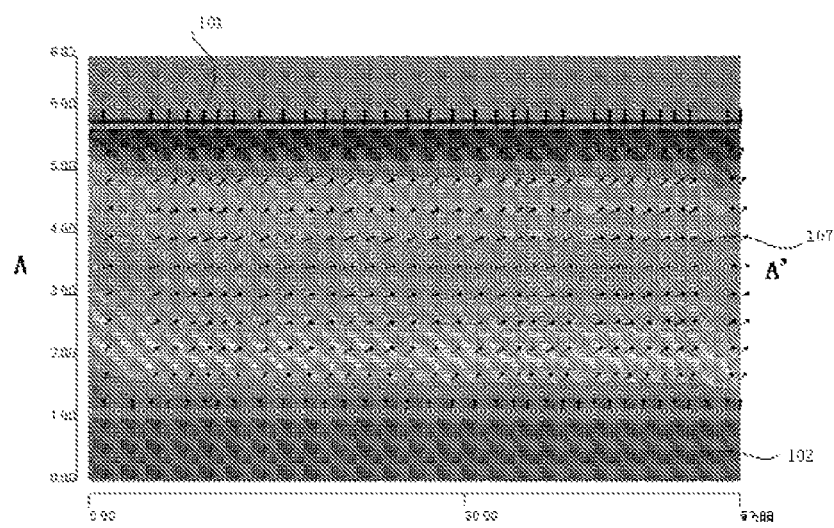
FIG. 9 is a sectional view of the top view diagram of the arrangement of liquid crystal molecules in the case of the application of a voltage when the liquid crystal display device with controllable viewing angle according to the present invention is in 9 o'clock viewing angle direction.
Figure 10:
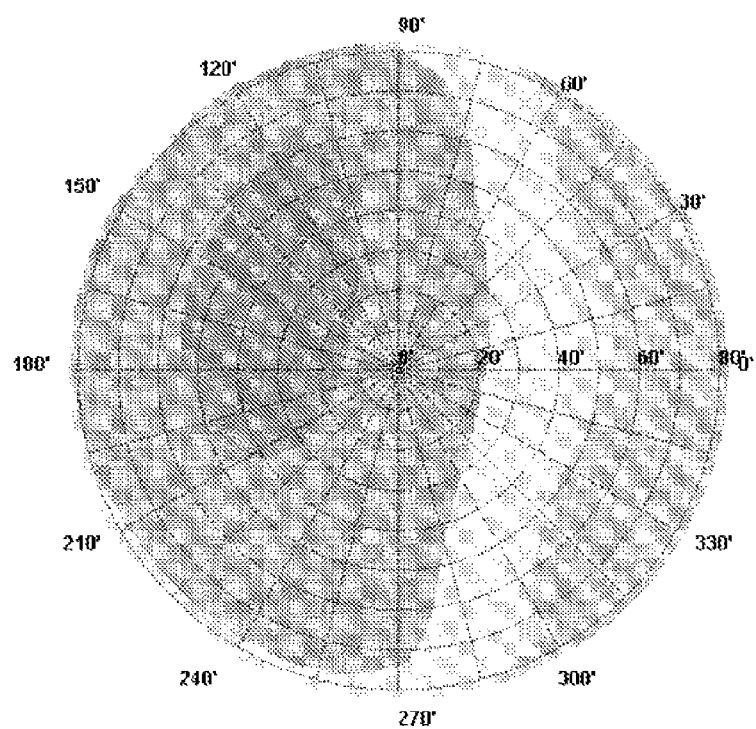
FIG. 10 is a viewing angle characteristic simulation diagram when the liquid crystal display device with controllable viewing angle according to the present invention is in 9 o'clock viewing angle direction.

Refer to FIG. 8 and FIG. 9, FIG. 8 shows the arrangement direction distribution diagram of the liquid crystal molecules to which a voltage is applied in the 9 o'clock viewing angle direction mode and FIG. 9 shows a sectional diagram taken along line AA' in the FIG. 8. FIG. 10 shows a viewing angle characteristic simulation diagram in the 9 o'clock viewing angle direction mode.

Those ordinarily skilled in the art should appreciate that various modifications and alterations can be made herein without departing from the spirit and scope of the invention. Therefore, it is to be understood that the invention includes all such modifications and alterations which fall within the scope of the appended claims and the substitutions.

What is claimed is:

1. A liquid crystal display device comprising:
   an upper substrate on which an upper substrate common electrode is disposed,
   a lower substrate parallel to the upper substrate on which a pixel electrode is disposed, and
   a liquid crystal layer sandwiched between the upper substrate and the lower substrate, and liquid crystal molecules are arranged perpendicular to the upper substrate in substance when no voltage is applied,
   wherein dielectric anisotropy of the liquid crystal molecules is negative,
   wherein a plurality of parallel strip-like lower substrate common electrodes are disposed on the lower substrate,
   wherein the liquid crystal display device is adapted to perform a first viewing angle mode by applying a voltage between the upper substrate common electrode and the pixel electrode to generate an electric field perpendicular to the upper substrate,
   wherein the liquid crystal display device is adapted to perform a second viewing angle mode by applying a voltage between the lower substrate common electrode and the pixel electrode to generate an electric field perpendicular to the upper substrate and an electric field parallel to the upper substrate, and
   wherein viewing direction in the first viewing angle mode is perpendicular to that in the second viewing angle mode.

2. The liquid crystal display device according to claim 1, wherein the lower substrate common electrode is floated if a voltage is applied between the upper substrate common electrode and the pixel electrode, and the upper substrate common electrode is floated if a voltage is applied between the lower substrate common electrode and the pixel electrode.

3. The liquid crystal display device according to claim 1, wherein an insulation layer is disposed between the lower substrate common electrode and the pixel electrode.

4. The liquid crystal display device according to claim 1, wherein the first viewing angle mode is a left viewing angle mode, and the second viewing angle mode is a lower viewing angle mode.

5. The liquid crystal display device according to claim 1, wherein the upper substrate common electrode, the lower substrate common electrode and the pixel electrode are all transparent electrodes.

6. The liquid crystal display device according to claim 5, wherein the transparent electrode includes one of ITO, IZO and IGO or a combination thereof.

7. The liquid crystal display device according to claim 1, wherein polarization plates are attached to outside of the upper substrate and the lower substrate respectively, and a direction of absorption axis of the polarization plate attached to the upper substrate is vertical to the direction of absorption axis of the polarization plate attached to the lower substrate.

8. A driving method for a liquid crystal display device, the liquid crystal display device comprising:
   an upper substrate on which an upper substrate common electrode is disposed, a lower substrate parallel to the upper substrate on which a pixel electrode is disposed, and a liquid crystal layer sandwiched between the upper substrate and the lower substrate, liquid crystal molecules are perpendicular to the upper substrate in substance when no voltage is applied, wherein dielectric anisotropy of the liquid crystal molecules is negative, and wherein a plurality of parallel strip-like lower substrate common electrodes are disposed on the lower substrate, the driving method comprising the following steps:

applying a voltage between the upper substrate common electrode and the pixel electrode to generate an electric field perpendicular to the upper substrate and thus provide a first viewing angle mode;

applying a voltage between the lower substrate common electrode and the pixel electrode to generate an electric field perpendicular to the upper substrate and an electric field parallel to the upper substrate and thus provide a second viewing angle mode; and switching between the first viewing angle mode and the second viewing angle mode by selectively applying the voltage to the upper substrate common electrode or the lower substrate common electrode, wherein a direction in the first viewing angle mode is perpendicular to that in the second viewing angle mode.

9. The driving method for a liquid crystal display device according to claim 8, wherein the lower substrate common electrode is floated if the voltage is applied to the upper substrate common electrode and the pixel electrode; and the upper substrate common electrode is floated if the voltage is applied to the lower substrate common electrode and the pixel electrode.

* * * * *